Patented Apr. 8, 1952

2,591,736

UNITED STATES PATENT OFFICE 2,591,736

KETODISILOXANES

Leo H. Sommer, Cambridge, Mass., assignor to Dow Corning Corporation, Midland, Mich., a corporation of Michigan No Drawing. Application January 3, 1951, Serial No. 204,271

6 Claims. (Cl. 260—448.2)

This invention relates to ketodisiloxanes wherein the oxygen is attached to a carbon atom gamma to the silicon, and to their method of preparation.

It is an object of this invention to prepare novel siloxanes which are excellent solvents, are intermediates for the preparation of other siloxanes, and are additives for siloxane fluids.

This invention relates to compounds of the formula $[R''COCHR'CH_2Si(CH_3)_2]_2O$ where $R''$ is alkyl or monocyclic aryl hydrocarbon and $R'$ is hydrogen or alkyl.

These ketosiloxanes are prepared by the sulfuric acid cleavage of gamma ketosilanes of the formula $R''COCHR'CH_2Si(CH_3)_2R$ in which R is methyl or phenyl. The reaction is carried out by mixing the acid and the silane, whereupon cleavage of the R group occurs with the formation of methane or benzene together with a sulfate ester of the silane. The latter is then hydrolyzed by the addition of water to give a silanol which condenses to the siloxane. The reaction proceeds at temperatures of from below 0° C. up. Preferably, the reaction is carried out between 0° C. and 100° C. The reaction may be represented by the following schematic equation:

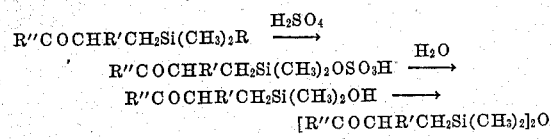

The cleavage reaction is quantitative and occurs not only with ketones but also with the corresponding aldehydes of the formula

The ketosilanes which are employed as intermediates in the process of this invention may be prepared by reacting iodosilanes with acetoaceticester and sodium. The equations given below show the various steps employed to synthesize these materials.

The latter compound upon hydrolysis, treatment with $SOCl_2$, and then $R''_2Cd$ as in Equation 1 produces $R(CH_3)_2SiCH_2CHR'COR''$. These reactions are described in greater detail by Leo H. Sommer and Nelson S. Marans Journal of the American Chemical Society 72, page 1935, May 1950.

The ketosiloxanes of this invention are useful as solvents, intermediates, and additives for conventional siloxanes.

The following examples are illustrative only and are not to be construed as limiting the invention, which is defined in the appended claims.

Example 1

17 grams of 4-trimethylsilyl-2-butanone was added slowly with stirring and external cooling to 50 cc. of concentrated sulfuric acid. During addition of the ketone and for 20 minutes thereafter, there was evolution of methane. The mixture was finally stirred and heated for one hour at 90° C. The resulting product was poured into an ice-water solution of 80 grams of NaOH. The mixture was extracted with three 150 cc. portions of ethyl ether. The combined extracts were dried over anhydrous sodium sulfate and then fractionated, whereupon 5,5,7,7-tetramethyl-5,7-disila-6-oxa-2,10-undecaneione $[CH_3COCH_2CH_2Si(CH_3)_2OSi(CH_3)_2CH_2CH_2COCH_3]$ was obtained in 45% yield. This material boiled at 142° C. at 6 mm., and had a density at 20° C. of 0.943 and a refractive index at 20° C. of 1.4390.

Example 2

When $(CH_3)_3SiCH_2CH(CH_3)COCH_3$, $(CH_3)_3SiCH_2CH(C_2H_5)COCH_3$, and $(CH_3)_3SiCH_2CH_2COC_6H_5$ are treated with $H_2SO_4$ as shown in Example 1, the compounds $[CH_3COCH(CH_3)CH_2Si(CH_3)_2]_2O$ $[CH_3COCH(C_2H_5)CH_2Si(CH_3)_2]_2O$, and $[C_6H_5COCH_2CH_2Si(CH_3)_2]_2O$ respectively are obtained.

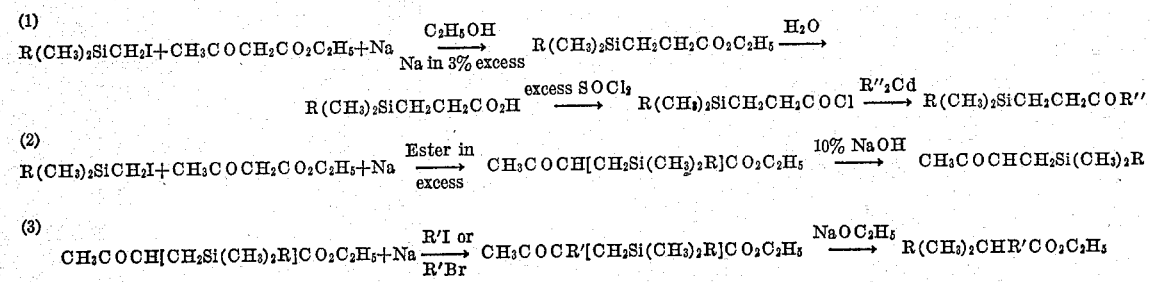

That which is claimed is:
1. A method of preparing ketosiloxanes of the formula [R″COCHR′CH$_2$Si(CH$_3$)$_2$]$_2$O where R″ is selected from the group consisting of alkyl and monocyclic aryl hydrocarbon radicals and R′ is selected from the group consisting of hydrogen and alkyl radicals which comprises reacting a silane of the formula R″COCHR′CH$_2$Si(CH$_3$)$_2$R in which R″ and R′ are as above defined and R is selected from the group consisting of methyl and phenyl radicals with concentrated sulfuric acid to form a sulfate ester of said silane, and thereafter hydrolyzing the sulfate ester to a silanol and condensing the silanol to said ketosiloxane.

2. A compound of the formula

[R″COCHR′CH$_2$Si(CH$_3$)$_2$]$_2$O where R″ is selected from the group consisting of alkyl and monocyclic aryl hydrocarbon radicals and R′ is selected from the group consisting of hydrogen and alkyl radicals.

3. [CH$_3$COCH$_2$CH$_2$Si(CH$_3$)$_2$]$_2$O
4. [CH$_3$COCH(CH$_3$)CH$_2$Si(CH$_3$)$_2$]$_2$O
5. [CH$_3$COCH(C$_2$H$_5$)CH$_2$Si(CH$_3$)$_2$]$_2$O
6. [C$_6$H$_5$COCH$_2$CH$_2$Si(CH$_3$)$_2$]$_2$O

LEO H. SOMMER.

No references cited.